(12) United States Patent
Abadir et al.

(10) Patent No.: US 11,398,913 B2
(45) Date of Patent: Jul. 26, 2022

(54) SECURE DISTRIBUTED INFORMATION SYSTEM FOR PUBLIC DEVICE AUTHENTICATION

(71) Applicant: Powch, LLC, Lancaster, PA (US)

(72) Inventors: Essam Abadir, Lancaster, PA (US); Rosco Schock, Lancaster, PA (US)

(73) Assignee: Powch, LLC, Lancaster, PA (US)

( * ) Notice: Subject to any disclaimer, the term of this patent is extended or adjusted under 35 U.S.C. 154(b) by 244 days.

(21) Appl. No.: 16/548,982

(22) Filed: Aug. 23, 2019

(65) Prior Publication Data

US 2020/0065458 A1 Feb. 27, 2020

Related U.S. Application Data

(60) Provisional application No. 62/735,592, filed on Sep. 24, 2018, provisional application No. 62/722,410, (Continued)

(51) Int. Cl.
*H04L 9/32* (2006.01)
*H04L 9/08* (2006.01)
(Continued)

(52) U.S. Cl.
CPC ............ *H04L 9/3234* (2013.01); *G06F 21/31* (2013.01); *G06F 21/602* (2013.01);
(Continued)

(58) Field of Classification Search
CPC ... H04L 9/3234; H04L 9/0819; H04L 9/0863; H04L 9/0877; H04L 63/123; H04L 9/0825; H04L 9/3213; H04L 9/3247; H04L 9/0891; H04L 63/18; H04L 9/0894; H04L 2463/082; H04L 63/0807; H04L 63/0428; H04L 63/126; H04L 2209/72;
(Continued)

(56) References Cited

U.S. PATENT DOCUMENTS 7,137,006 B1 11/2006 Grandcolas et al.
8,510,816 B2 8/2013 Quach et al.
(Continued)

*Primary Examiner* — Mohammed Waliullah
(74) *Attorney, Agent, or Firm* — Fox Rothschild LLP

(57) ABSTRACT

A method of performing user authentication includes by a service electronic device associated with a service, receiving, from a public electronic device, a request for a user to initiate a session of the service, generating a first security token, a first write token, a first read token, and/or a first delete token, sending the first security token, the first write token, the first read token, and/or the first delete token to a server electronic device, receiving, from the server electronic device, a key location identifier that uniquely identifies a memory location of a data store associated with the server electronic device where the first security token, the first write token, the first read token, and/or the first delete token are stored, saving the key location identifier in a data store associated with the service electronic device, generating a signed key location identifier, generating a machine-readable image that includes the key location identifier, the signed key location identifier and the first write token in an encoded format, and sending the machine-readable image to the public electronic device.

22 Claims, 5 Drawing Sheets

Related U.S. Application Data filed on Aug. 24, 2018, provisional application No. 62/722,630, filed on Aug. 24, 2018.

(51) Int. Cl.
  *G06F 21/31* (2013.01)
  *H04L 9/40* (2022.01)
  *G06F 21/60* (2013.01)
  *G06K 7/14* (2006.01)

(52) U.S. Cl.
  CPC ......... *G06K 7/1413* (2013.01); *G06K 7/1417* (2013.01); *H04L 9/0819* (2013.01); *H04L 9/0825* (2013.01); *H04L 9/0863* (2013.01); *H04L 9/0877* (2013.01); *H04L 9/0891* (2013.01); *H04L 9/0894* (2013.01); *H04L 9/3213* (2013.01); *H04L 9/3247* (2013.01); *H04L 63/123* (2013.01); *H04L 63/18* (2013.01); *H04L 2463/082* (2013.01)

(58) Field of Classification Search
  CPC .... G06K 7/1413; G06K 7/1417; G06F 21/31; G06F 21/602; G06F 2221/2111; G06F 21/6209
  See application file for complete search history.

(56) References Cited

U.S. PATENT DOCUMENTS

| | | |
|---|---|---|
| 8,578,454 B2 | 11/2013 | Grim |
| 8,627,088 B2 | 1/2014 | Mizrah |
| 9,055,029 B2 | 6/2015 | Narendra et al. |
| 9,077,713 B1 | 7/2015 | Zheng et al. |
| 9,094,212 B2 | 7/2015 | Thomas et al. |
| 9,313,185 B1 | 4/2016 | Pei |
| 9,369,289 B1 | 6/2016 | Harrison et al. |
| 9,985,786 B1 | 5/2018 | Bhabbur et al. |
| 2005/0210253 A1 | 9/2005 | Shigeeda |
| 2005/0273442 A1 | 12/2005 | Bennett et al. |
| 2009/0290715 A1 | 11/2009 | Mityagin et al. |
| 2010/0199089 A1 | 8/2010 | Vysogorets et al. |
| 2012/0204032 A1* | 8/2012 | Wilkins .............. H04L 63/0428 713/170 |
| 2013/0145447 A1 | 6/2013 | Maron |
| 2013/0219473 A1 | 8/2013 | Schaefer |
| 2014/0337957 A1 | 11/2014 | Feekes |
| 2015/0124963 A1 | 5/2015 | McCusker et al. |
| 2015/0169892 A1 | 6/2015 | Nord et al. |
| 2015/0244525 A1 | 8/2015 | McCusker et al. |
| 2015/0318993 A1 | 11/2015 | Hamlin et al. |
| 2016/0065590 A1 | 3/2016 | Gramelspacher et al. |
| 2016/0149923 A1* | 5/2016 | Zhang .................. H04M 15/73 726/4 |
| 2016/0248752 A1 | 8/2016 | Blinn |
| 2016/0286393 A1 | 9/2016 | Rasheed et al. |
| 2016/0307194 A1 | 10/2016 | Bhatnagar et al. |
| 2017/0180136 A1 | 6/2017 | Ibasco |
| 2017/0230363 A1 | 8/2017 | Deutschmann et al. |
| 2017/0272427 A1 | 9/2017 | Robison et al. |
| 2017/0288870 A1 | 10/2017 | Przydatek et al. |
| 2017/0324737 A1 | 11/2017 | Evans |
| 2017/0346804 A1 | 11/2017 | Beecham |
| 2018/0060558 A1 | 3/2018 | Bruderek et al. |
| 2018/0247082 A1* | 8/2018 | Durham .................. G06F 21/57 |
| 2018/0309740 A1 | 10/2018 | Brun et al. |
| 2019/0068585 A1 | 2/2019 | Zeng et al. |
| 2019/0095606 A1 | 3/2019 | Lewis et al. |
| 2020/0099539 A1 | 3/2020 | Bernsen et al. |
| 2020/0235932 A1 | 7/2020 | Gehrmann |

* cited by examiner

SECURE DISTRIBUTED INFORMATION SYSTEM FOR PUBLIC DEVICE AUTHENTICATION

CROSS-REFERENCE TO RELATED APPLICATIONS

This application claims priority to: (1) U.S. Patent Application No. 62/722,630, filed Aug. 24, 2018; (2) U.S. Patent Application No. 62/722,410, filed Aug. 24, 2018; and (3) U.S. Patent Application No. 62/735,592, filed Sep. 24, 2018. The disclosures of each priority application are fully incorporated into this document by reference.

BACKGROUND

Many computing devices maintain data sets that contain private information and data, such as healthcare data, payment information, personal data, or other such data. Computing devices attempt to protect such data by restricting access to the data and encrypting the data. However, in some instances, it may be beneficial to access such information from a public device. As such, security mechanisms are needed to prevent this information from being compromised by virtue of access via a public device.

SUMMARY

A method of performing user authentication includes by a service electronic device associated with a service, receiving, from a public electronic device, a request for a user to initiate a session of the service, generating a first security token, a first write token, a first read token, and/or a first delete token, sending the first security token, the first write token, the first read token, and/or the first delete token to a server electronic device, receiving, from the server electronic device, a key location identifier that uniquely identifies a memory location of a data store associated with the server electronic device where the first security token, the first write token, the first read token, and/or the first delete token are stored, saving the key location identifier in a data store associated with the service electronic device, generating a signed key location identifier, generating a machine-readable image that includes the key location identifier, the signed key location identifier and the first write token in an encoded format, and sending the machine-readable image to the public electronic device.

The public electronic device may receive the machine-readable image, and cause the machine-readable image to be displayed on a display device of the public electronic device. A user electronic device may scan the machine-readable image to extract the key location identifier, the signed key location identifier and the first write token, verify that the signed key location identifier is valid for a public key associated with the service, combine a public key associated with the user and the first write token to generate a combination value, sign the combination value to generate a signed combination value, encrypt the signed combination value to generate an encrypted signed combination value, and send the encrypted signed combination value, a second security token, a second read token, and a second key location identifier to the server electronic device. The second security token and the second read token are generated by the electronic device and correspond to the user, the second key location identifier uniquely identifies a second memory location of a data store associated with the server electronic device, and the first memory location and the second memory location are not the same.

Signing the combination value to generate a signed combination value may include using a private key associated with the user to sign the combination value. Encrypting the signed combination value to generate an encrypted signed combination value may include encrypting the signed combination value using a public key associated with the service.

The server electronic device may verify that the second security token corresponds to information stored at the second memory location. In response to verifying that the second security token corresponds to information stored at the second memory location, the server electronic device may save the second read token and the encrypted signed combination value to the second memory location. The server electronic device may receive the first key location identifier, the first write token and the encrypted signed combination value from the user electronic device, verify that the first write token corresponds to information saved at the first memory location, and in response to verifying that the first write token corresponds to information saved at the first memory location, save the encrypted signed combination value to the first memory location.

The server electronic device may receive the first key location identifier and the first read token from the service electronic device, verify that the first read token corresponds to information stored at the first memory location, and in response to verifying that the first read token corresponds to information stored at the first memory location, send the encrypted signed combination value to the service electronic device.

The service electronic device may obtain a first decrypted combination value by decrypting the encrypted signed combination value using the private key associated with the service, extracting the public key associated with the user from the first decrypted combination value, use the public key to locate an account associated with the user, and send the second key location identifier and the second read token to the server electronic device.

The server electronic device may verify that the second read token corresponds to information stored at the second memory location, and in response to verifying that the second read token corresponds to information stored at the second memory location, send the encrypted signed combination value to the service electronic device.

The service electronic device may obtain a second decrypted combination value by decrypting the encrypted signed combination value received from the server electronic device using the private key associated with the service, compare the second decrypted combination value to the first decrypted combination value to determine if they match, and in response to the second decrypted combination value matching the first decrypted combination value, authenticating the session.

The server electronic device may receive the first key location identifier and the first delete token from the service electronic device, verify that the first delete token corresponds to information stored at the first memory location, and in response to verifying that the first delete token corresponds to information stored at the first memory location, delete all information stored at the first memory location.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include, for example, smartphones, personal digital assistants, cameras, tablet devices, electronic readers, personal computers, servers, and the like.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when terms such "first" and "second" are used to modify a noun, such use is simply intended to distinguish one item from another, and is not intended to require a sequential order unless specifically stated.

Figure 1:
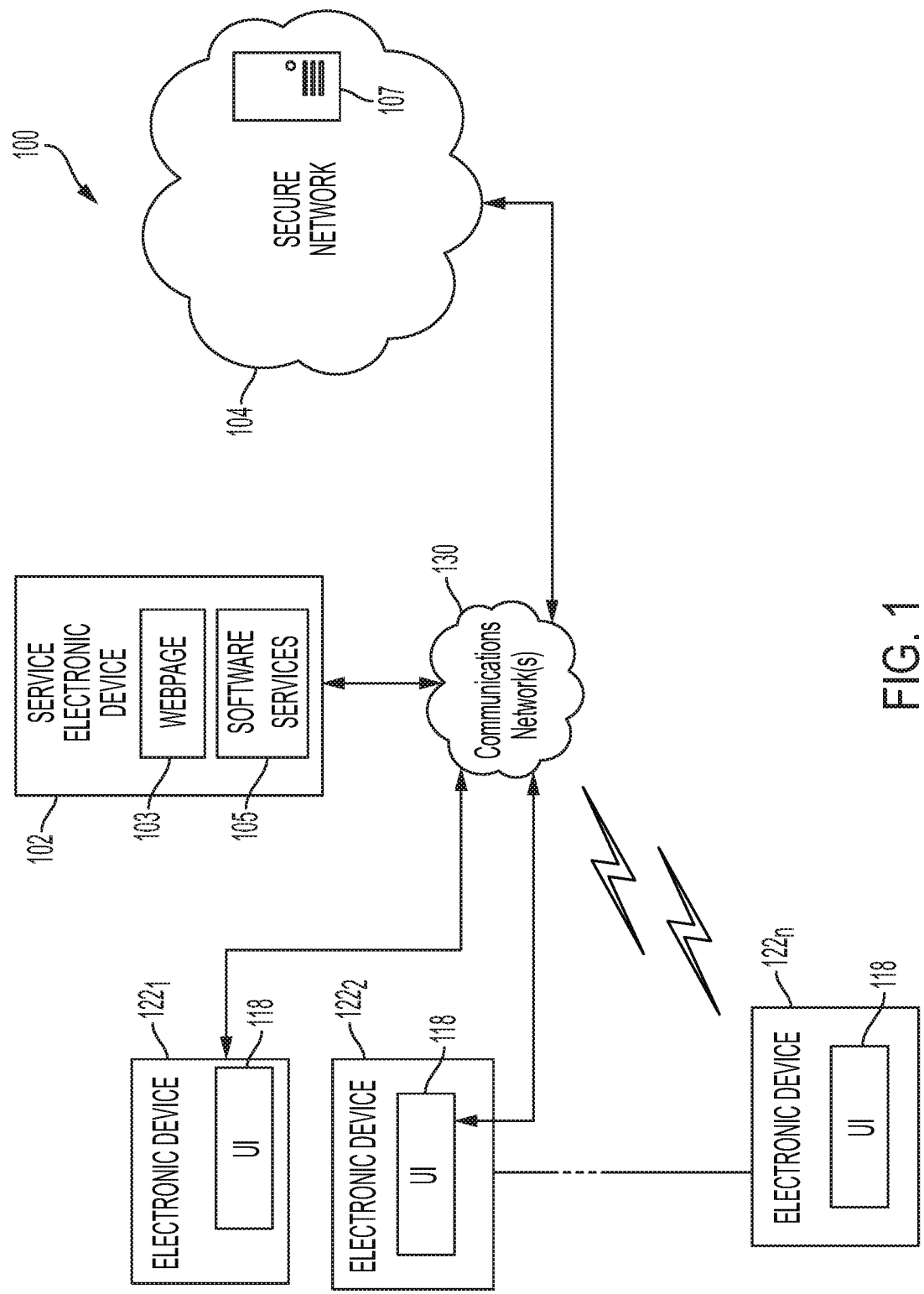
FIG. 1 is a block diagram illustrating a computing environment for sharing of encrypted data, according to aspects of the present disclosure.

FIG. 1 illustrates an example of a computer network 100 (e.g., a telecommunications network) that may be used to share encrypted data between a device that originally stored the data and a different device. Generally, the computer network 100 includes various devices communicating and functioning together to enable private data share between a first device and a second, different, device. As illustrated, a communications network 130 allows for communication in the computer network 100. The communications network 130 may include via or more wireless networks such as, but not limited to one or more of a Local Area Network (LAN), Wireless Local Area Network (WLAN), a Personal Area Network (PAN), Campus Area Network (CAN), a Metropolitan Area Network (MAN), a Wde Area Network (WAN), a Wireless Wde Area Network (VWVAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. Network 130 may also include wired networks.

In an illustrative usage scenario, a user may interact with user-interface (UI) 118 of one or more electronic devices $122_1, 122_2, \ldots 122_N$ to request access to various services, such as a webpage, a site, software service, application, content and/or the like (referred to throughout this disclosure as a "service"), located at a service electronic device 102 that is associated with one or more services (illustrated as webpage 103 and software service 105). The one or more electronic devices $122_1, 122_2, \ldots 122_N$, may be a personal computer, work station, mobile device, mobile phone, tablet device, kiosk, processor, and/or other processing device capable of implementing and/or executing processes, software, applications, etc., that includes network-enabled devices and/or software, such as a user-interface 118 for communication over the communications network 130 (e.g., browsing the internet). Additionally, the one or more electronic devices $122_1, 122_2, \ldots 122_N$, may include one or more processors that process software or other machine-readable instructions and may include a memory to store the software or other machine-readable instructions and data. In various embodiments, an application or other interface of an electronic device $122_1, 122_2, \ldots 122_N$ may permit the electronic device to communicate with a service electronic device, a server electronic device or another electronic device. For example, an Internet browser or an application that is installed on an electronic device may be used.

The request may be transmitted from the service electronic device 102 to an out-of-band secure network 104, which may be any type of private communications computing network including one or more electronic devices, such as server electronic device 107. In one specific example, the secure network 104 and/or server electronic device 107 may manage the encryption and decryption of public and/or private keys used to authenticate users involved in a single-step, out-of-band authentication process, wherein the users are requesting access to webpages 103 and/or software services 105 of the service electronic device 102.

The user input may be transmitted to a secure network 102, which may be any type of private communications computing network including one or more electronic devices, such as server 104. In one specific example, the secure network 102 and/or server 104 may manage the ability of one or more of the one or more electronic devices $122_1, 122_2, \ldots 122_N$ to share private and/or encrypted data with another different device, such as one of the one or more electronic devices 122₁, 122₂,-122_N other than the particular electronic device originally storing the private and encrypted data.

Figure 2:
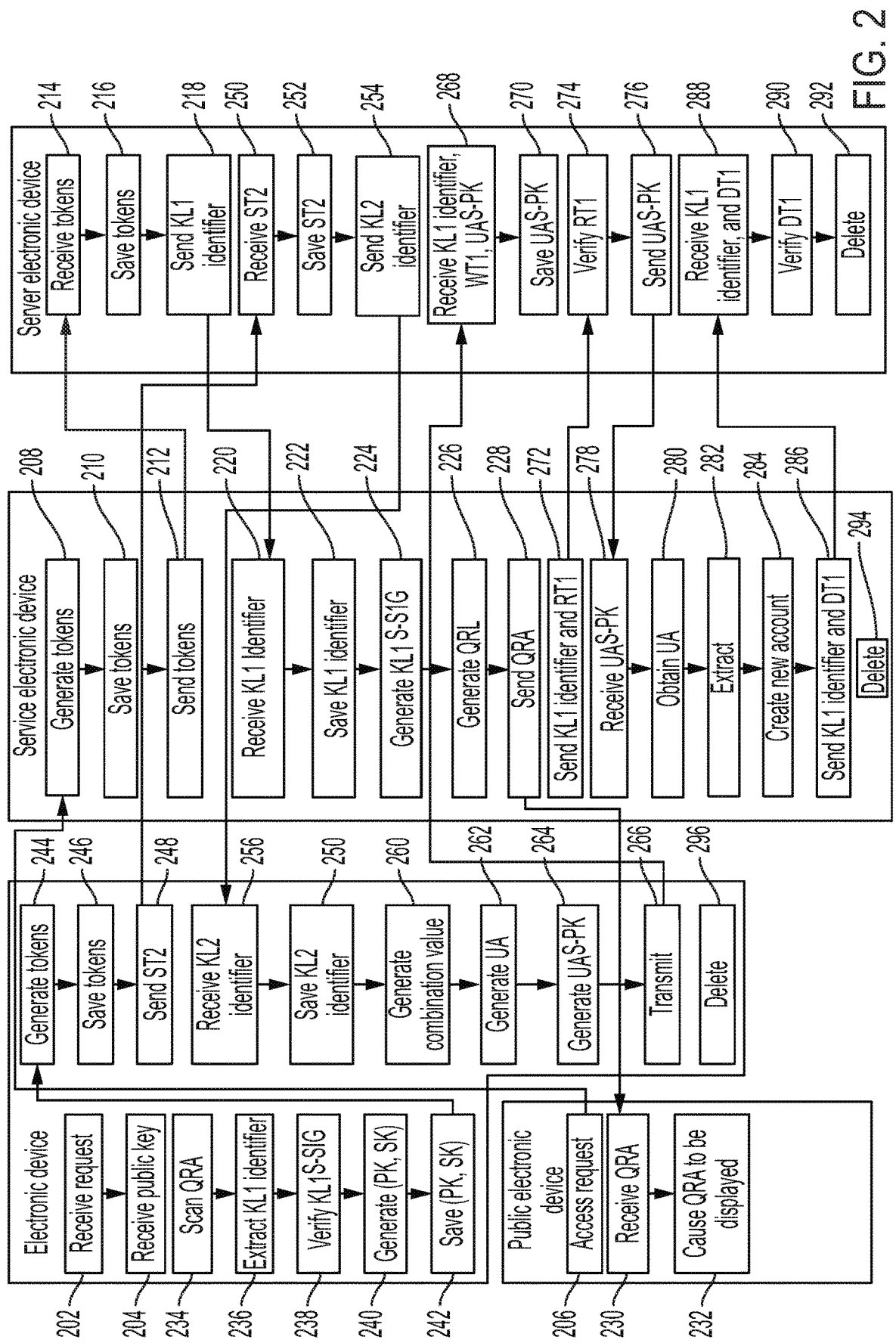
FIG. 2 illustrates an example account creation process utilizing a public electronic device.

FIG. 2 illustrates an example account creation process utilizing a public electronic device according to an embodiment. In various embodiments, the process illustrated by FIG. 2 may be implemented and/or executed by the computing network of FIG. 1. A public electronic device refers to an electronic device that may be accessible by multiple different users. Examples of public electronic devices may include, for example, a public computer, a public tablet, a kiosk and/or the like.

As illustrated by FIG. 2, an electronic device associated with a user may receive 202 a request from the user to enter, download, and/or otherwise access a service. At 204, in response to the request, a public key (S-PK) corresponding to the service is received and stored on the user's electronic device.

In various embodiments, the user may request 206 access to the service on a public electronic device that is in communication with the service. In response to receiving a request from a public electronic device, a service electronic device may generate 208 a security token (ST1), a write token (WT1), a read token (RT1), and/or a delete token (DT1). One or more of the generated tokens may extend one or more benefits or privileges to a holder of the token. For example, ST1 may grant to its holder access to certain secret or private information. As another example, RT1 may permit its owner to read certain secret or private information, and WT1 may grant to its holder the ability to write certain secret or private information. And as another example, a DT may permit its owner to delete certain secret or private information. The service electronic device may save 210 ST1, WT1, RT1 and/or DT1 to a data store associated with the service. The service electronic device may send 212 ST1, WT1, RT1 and/or DT1 to a server electronic device.

The server electronic device may receive 214 ST1, WT1, RT1 and/or DT1, and may save 216 ST1, WT1, RT1 and/or DT1 to a memory location (KL1) of a data store of the server electronic device or a data store that is accessible by the server electronic device. The server electronic device may send 218 an identifier associated with KL1 to the service electronic device. The identifier may uniquely identify KL1 such as, for example, an address or other unique identifier.

The service electronic device may receive 220 the KL1 identifier, and may save 222 the KL1 identifier to a data store of the service electronic device or a data store that is accessible by the service electronic device. The service electronic device may generate 224 a signed location identifier value by signing a combination of KL1 identifier and WT1 (e.g., KL1 identifier+WT1) with S-SK (KL1$^{S-SIG}$).

In various embodiments, the service electronic device may generate 226 a machine-readable image (QRA) that includes the KL1 identifier, WT1 and/or KL1$^{S-SIG}$. For example, the electronic device may create a Quick Response (QR) code or a barcode that includes the KL1 identifier, WT1 and/or KL1$^{S-SIG}$ in an encoded format. The service electronic device may send 228 QRA to the public electronic device. The public electronic device may receive 230 QRA and may cause 232 QRA to be displayed on a display device of the public electronic device.

The user may use his or her electronic device to scan 234 or otherwise read QRA. For example, if QRA is a QR code, a QR code reader of the electronic device may scan QRA. As another example, if QRA is a barcode, a barcode reader of the electronic device may scan QRA. The user's electronic device may extract 236 the KL1 identifier, WT1 and/or KL1$^{S-SIG}$ from QRA. The electronic device may verify 238 that KL1$^{S-SIG}$ is valid for S-PK on the electronic device.

The electronic device may generate 240 a strong public/private key pair (PK, SK) (e.g., 256-bit). The electronic device may save 242 the key pair to a data store of the electronic device or a data store that is accessible by the electronic device.

The electronic device may generate 244 a user token (UT2), a security token (ST2), a read token (RT2), and/or a delete token (DT2). One or more of UT2, ST2, RT2 and/or DT2 may be randomly generated. One or more of UT2, ST2, RT2 and/or DT2 may be saved 246 to a data store of the electronic device or a data store that is accessible by the electronic device.

The electronic device may transmit 248 ST2 to the server electronic device. The server electronic device may receive 250 ST2, and may write 252 ST2 to a memory location (KL2) of a data store of the server electronic device or that is in communication with the server electronic device. KL2 may be a randomly-assigned memory location. In various embodiments, KL1 and KL2 may be different memory locations.

The server electronic device may send 254 an identifier associated with KL2 to the electronic device. The identifier may uniquely identify KL2, and may be an address or other identifier. The electronic device may receive 256 the KL2 identifier, and may save 258 the KL2 identifier to a data store of the electronic device or a data store that is in communication with the electronic device.

In various embodiments, the electronic device may generate 260 a combination value by combining PK, UT2, RT2, and/or the KL2 identifier. These values may be combined in any suitable way, such as, for example, by appending the values together. The electronic device may generate 262 a user authentication token (UA) by signing the combination value with SK.

In various embodiments, the electronic device may generate 264 an encrypted user authentication token (UA$^{S-PK}$) by encrypting UA with S-PK. The electronic device may transmit 266 the KL1 identifier, WT1 and/or UA$^{S-PK}$ to the server electronic device.

The server electronic device may receive 268 the KL1 identifier, WT1 and/or UA$^{S-PK}$, and may verify that WT1 corresponds to information stored at KL1. In response to verifying that WT1 corresponds to information stored at KL1, the server electronic device may write 270 UA$^{S-PK}$ to KL1.

The service electronic device may send 272 the KL1 identifier and RT1 to the server electronic device. The server electronic device may verify 274 that RT1 corresponds to information stored at KL1. In response to verifying that RT1 corresponds to information stored at KL1, the server electronic device may send 276 UA$^{S-PK}$ to the service electronic device.

The service electronic device may receive 278 UA$^{S-PK}$ and may obtain 280 the user authentication token by decrypting UA$^{S-PK}$ using S-SK. The service electronic device may extract 282 PK, UT2, RT2 and/or the KL2 identifier from UA. The service electronic device may create 284 a new account for the user using PK, UT2, RT2 and/or the KL2 identifier.

The service electronic device may send 286 the KL1 identifier and DT1 to the server electronic device. The server electronic device may receive 288 the KL1 identifier and DT1, and may verify 290 that DT1 corresponds to information stored at KL1. In response to verifying that DT1 corresponds to information stored at KL1, the server electronic device may delete 292 all information that is stored at KL1. The service electronic device may delete 294 ST1, WT1, RT1 and/or DT1 from its data store(s). The electronic device may delete 296 PK, SK, UT2, ST2, WT2, RT2, DT2 and/or the KL2 identifier from its data store(s).

Figure 3A:
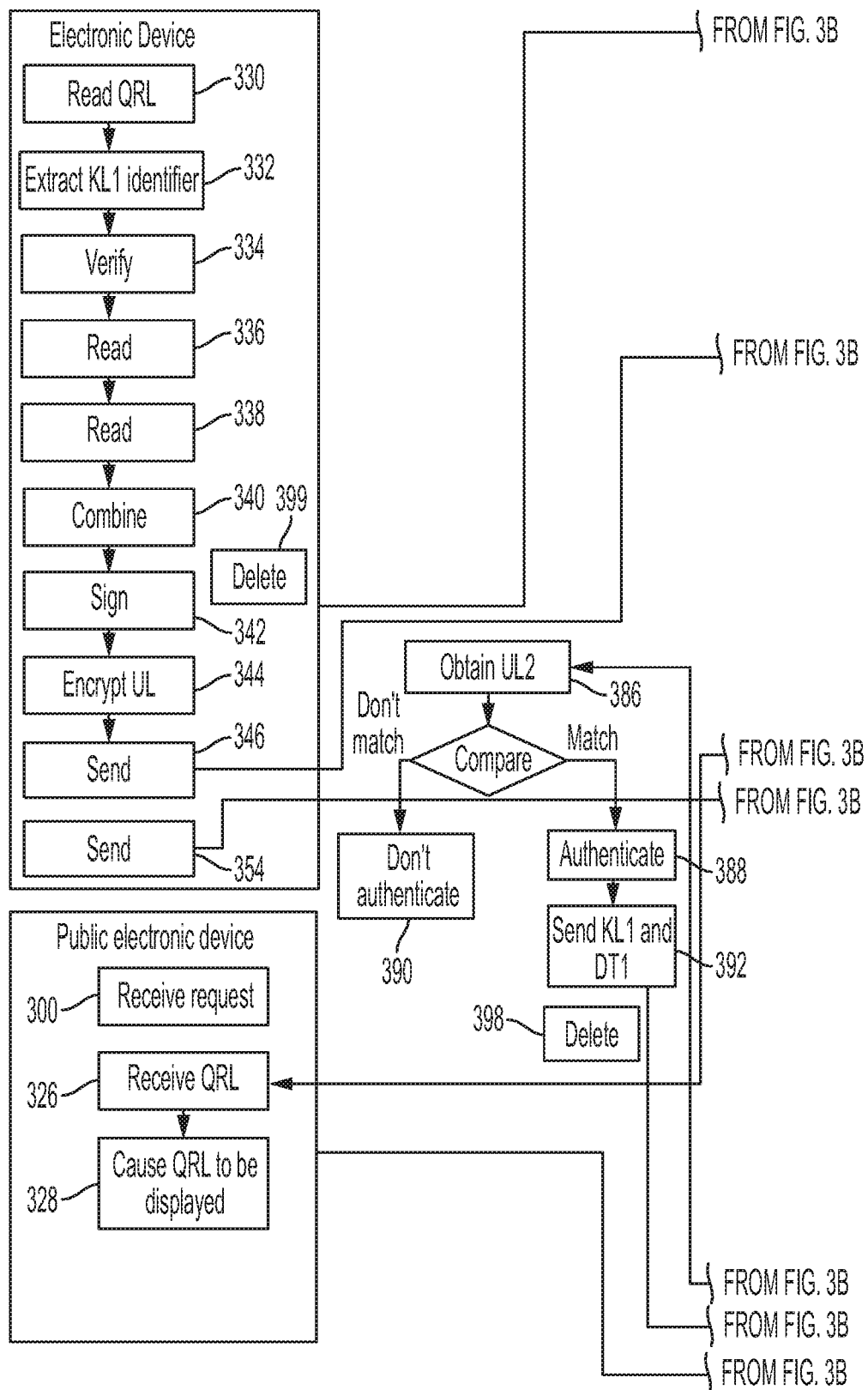
FIGS. 3A and 3B illustrate an example authentication process for a public electronic device.
Figure 3B:
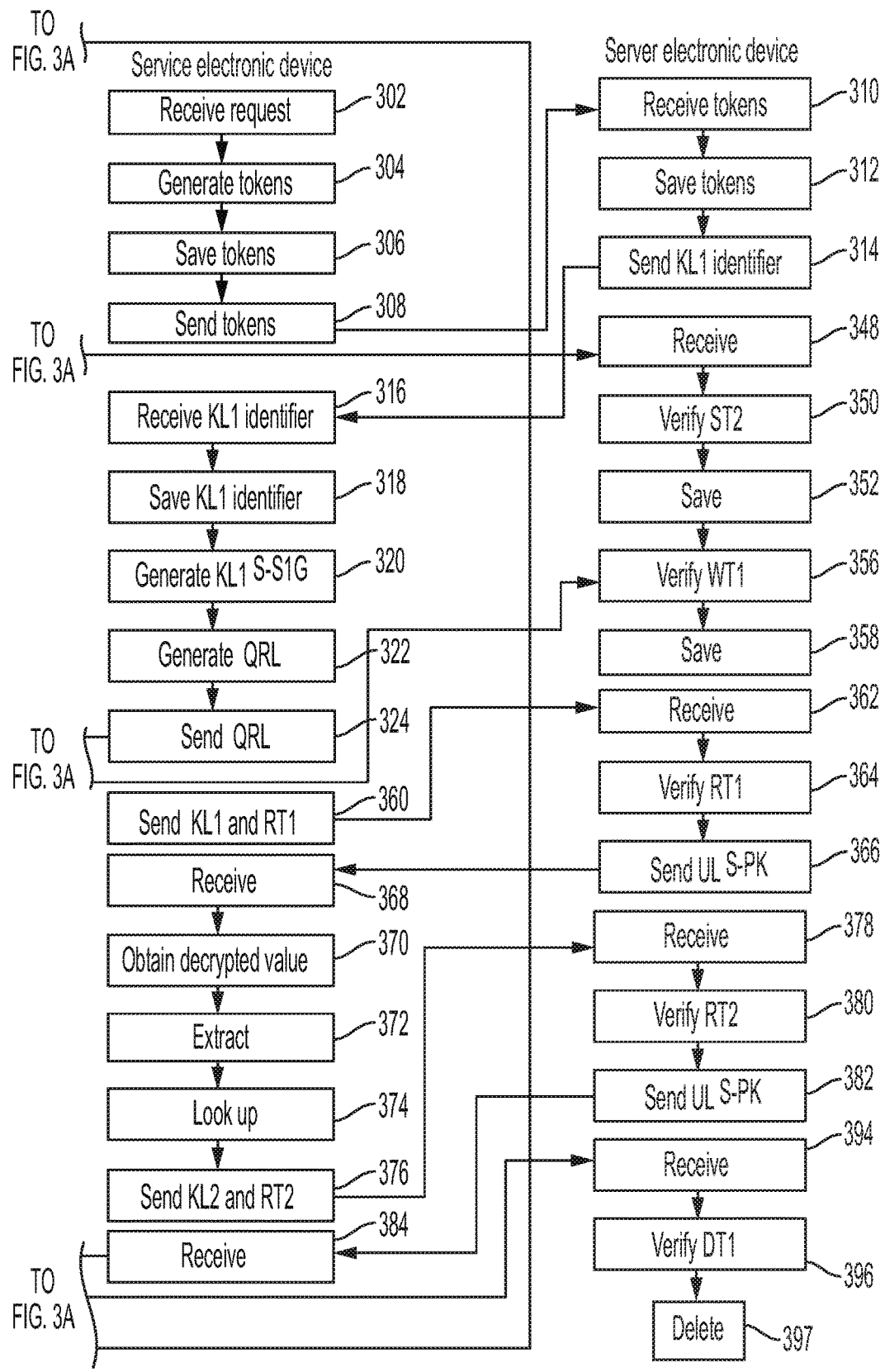

FIGS. 3A-3B illustrates an example authentication process for a public electronic device according to an embodiment. As illustrated by FIGS. 3A-3B, a public electronic device may receive 300 a request from the user to initiate a session of a service (e.g., so that the user may log into or otherwise request access to the service). The service may be the same as the one referenced above with respect to FIG. 2.

The service electronic device may receive 302 the request, and may generate 304 a security token (ST1), a write token (WT1), a read token (RT1) and/or a delete token (DT1). The service may save 306 ST1, WT1, RT1, and/or DT1 in one or more data stores associated with the service electronic device. The service electronic device may send 308 ST1, WT1, RT1 and/or DT1 to a server electronic device. The server electronic device may receive 310 ST1, WT1, RT1 and/or DT1, and may write 312 ST1, WT1, RT1 and/or DT1 to a memory location (KL1) of a data store associated with the server electronic device. The server electronic device may send 314 a memory location identifier (KL1 identifier) that is uniquely associated with the memory location to the service.

The service electronic device may receive 316 the KL1 identifier, and may save 318 KL1 in a data store associated with the service electronic device. In various embodiments, the service electronic device may generate 320 a signed version of KL1. For example, the service electronic device may sign a value that represents a combination of KL1+WT1 with S-SK to generate a signed version of KL1 ($KL1^{S\text{-}SIG}$). The service electronic device may generate 322 a machine-readable image (QRL) that includes the KL1 identifier, WT1 and/or $KL1^{S\text{-}SIG}$. For example, the service electronic device may generate 322 a Quick Response (QR) code or a barcode that includes the KL1 identifier, WT1 and/or $KL1^{S\text{-}SIG}$ in an encoded format. The service electronic device may send 324 QRL to the public electronic device. The public electronic device may receive 326 QRL and may cause 328 QRL to be displayed on a display device of the public electronic device.

The user may use his or her electronic device (which may be referred to in this disclosure as a "user electronic device") to scan 330 or otherwise read QRL. For example, if QRL is a QR code, a QR code reader of the electronic device may scan QRL. As another example, if QRL is a barcode, a barcode reader of the electronic device may scan QRL. The user's electronic device may extract 332 the KL1 identifier, WT1 and/or $KL1^{S\text{-}SIG}$ from QRL. The electronic device may verify 334 that $KL1^{S\text{-}SIG}$ is valid for S-PK on the electronic device.

In various embodiments, the electronic device may read 336 PK, SK, and/or S-PK from one or more data stores associated with the electronic device. The electronic device may read 338 ST2, RT2 and/or KL2 from one or more data stores associated with the electronic device. The electronic device may combine 340 PK and WT1, and may sign 342 the combined value using SK to generate a signed combination value (UL). The electronic device may encrypt 344 UL using S-PK to generate an encrypted combination signed value ($UL^{S\text{-}PK}$).

The electronic device may send 346 KL2, ST2, RT2, and/or $UL^{S\text{-}PK}$ to the server electronic device. The server electronic device may receive 348 KL2, ST2, RT2, and/or $UL^{S\text{-}PK}$. The server electronic device may verify 350 that ST2 corresponds to information stored at KL2. In response to verifying that ST2 corresponds to information stored at KL2, the server electronic device may write 352 RT2 and $UL^{S\text{-}PK}$ to KL2. The electronic device may send 354 KL1, WT1 and/or $UL^{S\text{-}PK}$ to the server electronic device. The server electronic device may receive KL1, WT1 and/or $UL^{S\text{-}PK}$ and may verify 356 that WT1 corresponds to information stored at KL1. In response to verifying that WT1 corresponds to information stored at KL1, the server electronic device may write 358 $UL^{S\text{-}PK}$ to KL1.

In various embodiments, the service may send 360 KL1 and RT1 to the server electronic device. The server electronic device may receive 362 KL1 and RT1, and may verify 364 that RT1 corresponds to information stored at KL1. In response to verifying that RT1 corresponds to information stored at KL1, the server electronic device may send 366 $UL^{S\text{-}PK}$ to the service.

In an embodiment, the service electronic device may receive 368 $UL^{S\text{-}PK}$. The service may obtain 370 a decrypted value (UL) by decrypting $UL^{S\text{-}PK}$ using S-SK. The service electronic device may extract 372 PK and WT1 from UL. In various embodiments, the service may look up 374 the account associated with the user corresponding to PK using PK. The service electronic device may transmit 376 KL2 and/or RT2 to the server electronic device.

The server electronic device may receive 378 KL2 and/or RT2, and may verify 380 that RT2 corresponds to information stored at KL2. For example, the server electronic device may verify whether RT2 matches information stored at KL2. In response to verifying that RT2 corresponds to information stored at KL2, the server electronic device may send 382 $UL^{S\text{-}PK}$ to the service.

The service electronic device may receive 384 $UL^{S\text{-}PK}$ and may obtain 386 a corresponding decrypted value (UL2). For example, the service electronic device may decrypt $UL^{S\text{-}PK}$ using S-SK. In an embodiment, the service electronic device may compare UL to UL2. If UL matches UL2, the service may authenticate 388 the user's session. If UL does not match UL2, the service electronic device may not authenticate 390 the user's session. The service electronic device may send 392 KL1 and/or DT1 to the server electronic device.

The server electronic device may receive 394 KL1 and/or DT1, and may verify 396 that DT1 corresponds to information stored at KL1. In response to verifying that DT1 corresponds to information stored at KL1, the server electronic device may delete 397 all information stored at KL1. The service electronic device may delete 398 ST1, WT1, RT1, and DT1 from its storage. The electronic device may delete 399 PK, SK, UT2, ST2, WT2, RT2, DT2, and/or the KL2 identifier from its storage.

Figure 4:
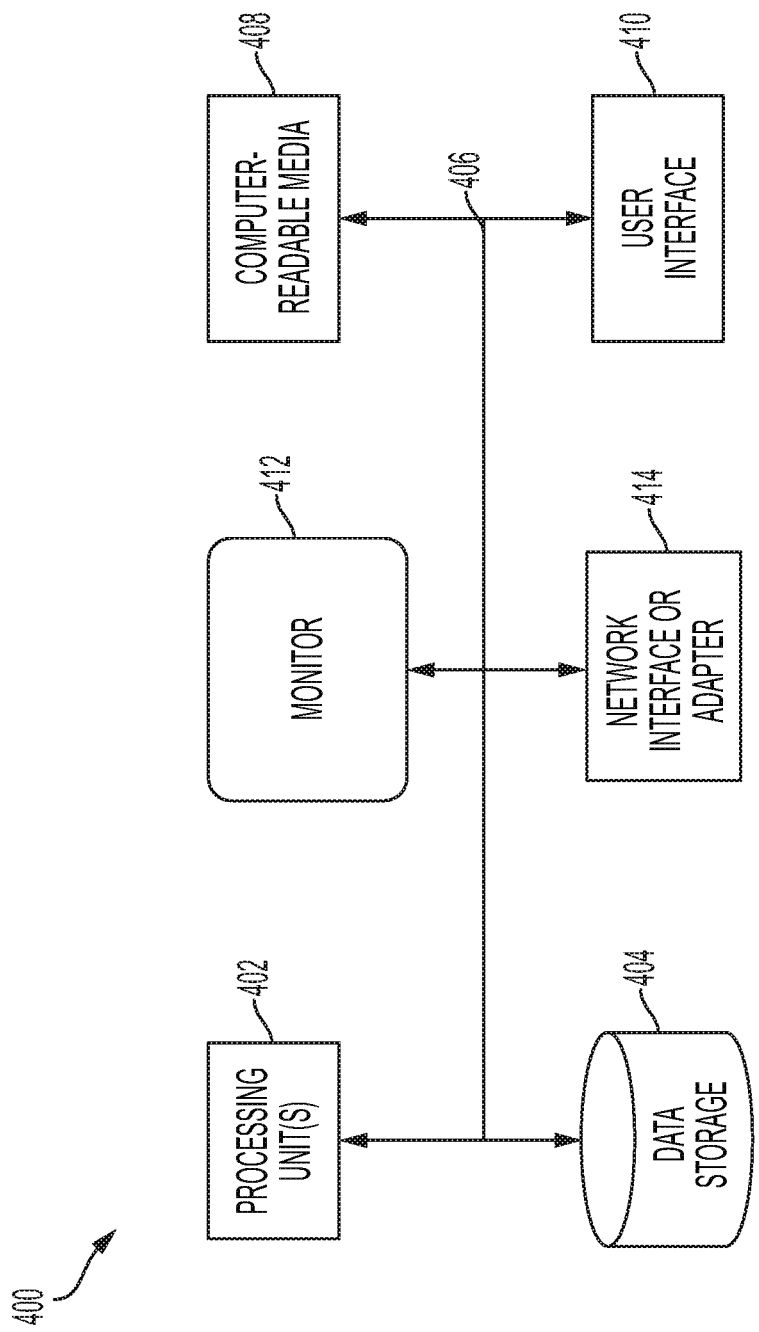
FIG. 4 illustrates an example of a computing and networking environment that may be used to implement various aspects of the present disclosure

FIG. 4 illustrates an example of a computing and networking environment 400 that may be used to implement various aspects of the present disclosure, such as those described in FIGS. 2 and 3. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball, or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method of performing user authentication, the method comprising:
  by a service electronic device associated with a service:

receiving, from a public electronic device, a request for a user to initiate a session of the service, generating a first write token sending the first write token to a server electronic device, receiving, from the server electronic device, a key location identifier that uniquely identifies a memory location of a data store associated with the server electronic device where the first write token is stored, saving the key location identifier in a data store associated with the service electronic device, generating a signed key location identifier, generating a machine-readable image that includes the key location identifier, the signed key location identifier and the first write token in an encoded format, and sending the machine-readable image to the public electronic device.

2. The method of claim 1, further comprising:
by the public electronic device:
receiving the machine-readable image, and
causing the machine-readable image to be displayed on a display device of the public electronic device,
by a user electronic device:
scanning the machine-readable image to extract the key location identifier, the signed key location identifier and the first write token,
verifying that the signed key location identifier is valid for a public key associated with the service,
combining a public key associated with the user and the first write token to generate a combination value,
signing the combination value to generate a signed combination value,
encrypting the signed combination value to generate an encrypted signed combination value, and
sending the encrypted signed combination value, a first security token, a first read token, and a second key location identifier to the server electronic device, wherein the first security token and the first read token are generated by the electronic device and correspond to the user, wherein the second key location identifier uniquely identifies a second memory location of a data store associated with the server electronic device, wherein the first memory location and the second memory location are not the same.

3. The method of claim 2, wherein signing the combination value to generate a signed combination value comprises using a private key associated with the user to sign the combination value.

4. The method of 2, wherein encrypting the signed combination value to generate an encrypted signed combination value comprises encrypting the signed combination value using a public key associated with the service.

5. The method of claim 2, further comprising: by the server electronic device: verifying that the first security token corresponds to information stored at the second memory location, in response to verifying that the first security token corresponds to information stored at the second memory location, saving the first read token and the encrypted signed combination value to the second memory location.

6. The method of claim 5, further comprising:
by the server electronic device:
receiving the first key location identifier, the first write token and the encrypted signed combination value from the user electronic device,
verifying that the first write token corresponds to information saved at the first memory location, and
in response to verifying that the first write token corresponds to information saved at the first memory location, saving the encrypted signed combination value to the first memory location.

7. The method of claim 6, further comprising:
by the server electronic device:
receiving the first key location identifier and a second read token from the service electronic device,
verify that a second read token corresponds to information stored at the first memory location, and
in response to verifying that a second read token corresponds to information stored at the first memory location, sending the encrypted signed combination value to the service electronic device.

8. The method of claim 7, further comprising:
by the service electronic device:
obtaining a first decrypted combination value by decrypting the encrypted signed combination value using the private key associated with the service;
extracting the public key associated with the user from the first decrypted combination value;
using the public key to locate an account associated with the user; and
sending the second key location identifier and the first read token to the server electronic device.

9. The method of claim 8, further comprising:
by the server electronic device:
verifying that the first read token corresponds to information stored at the second memory location, and
in response to verifying that the first read token corresponds to information stored at the second memory location, sending the encrypted signed combination value to the service electronic device.

10. The method of claim 9, further comprising:
by the service electronic device:
obtaining a second decrypted combination value by decrypting the encrypted signed combination value received from the server electronic device using the private key associated with the service,
comparing the second decrypted combination value to the first decrypted combination value to determine if they match, and
in response to the second decrypted combination value matching the first decrypted combination value, authenticating the session.

11. The method of claim 10, further comprising:
by the server electronic device:
receiving the first key location identifier and a first delete token from the service electronic device,
verifying that the first delete token corresponds to information stored at the first memory location, and
in response to verifying that the first delete token corresponds to information stored at the first memory location, deleting all information stored at the first memory location.

12. A system for performing user authentication, the system comprising:
a service electronic device associated with a service; and
a computer-readable storage medium comprising one or more programming instructions that, when executed, cause the service electronic device to:
receive, from a public electronic device, a request for a user to initiate a session of the service,
generate a first write token,
send the first write token to a server electronic device, receive, from the server electronic device, a key location identifier that uniquely identifies a memory location of a data store associated with the server electronic device where the first write token is stored, save the key location identifier in a data store associated with the service electronic device, generate a signed key location identifier, generate a machine-readable image that includes the key location identifier, the signed key location identifier and the first write token in an encoded format, and send the machine-readable image to the public electronic device.

13. The system of claim 12, further comprising:

a second computer-readable storage medium comprising one or more programming instructions that, when executed, cause the public electronic device to:

receive the machine-readable image, and cause the machine-readable image to be displayed on a display device of the public electronic device, a third computer-readable storage medium comprising one or more programming instructions that, when executed, cause a user electronic device:

scan the machine-readable image to extract the key location identifier, the signed key location identifier and the first write token, verify that the signed key location identifier is valid for a public key associated with the service, combine a public key associated with the user and the first write token to generate a combination value, sign the combination value to generate a signed combination value, encrypt the signed combination value to generate an encrypted signed combination value, and send the encrypted signed combination value, a first security token, a first read token, and a second key location identifier to the server electronic device, wherein the first security token and the first read token are generated by the electronic device and correspond to the user, wherein the second key location identifier uniquely identifies a second memory location of a data store associated with the server electronic device, wherein the first memory location and the second memory location are not the same.

14. The system of claim 13, wherein the one or more programming instructions that, when executed, cause the user electronic device to sign the combination value to generate a signed combination value comprise one or more programming instructions that, when executed, cause the user electronic device to use a private key associated with the user to sign the combination value.

15. The system of 13, wherein the one or more programming instructions that, when executed, cause the user electronic device to encrypt the signed combination value to generate an encrypted signed combination value comprise one or more programming instructions that, when executed, cause the user electronic device to encrypt the signed combination value using a public key associated with the service.

16. The system of claim 13, further comprising a fourth computer-readable storage medium comprising one or more programming instructions that, when executed, cause the server electronic device to:

verify that the first security token corresponds to information stored at the second memory location, and in response to verifying that the first security token corresponds to information stored at the second memory location, save the first token and the encrypted signed combination value to the second memory location.

17. The system of claim 16, wherein the fourth computer-readable storage medium further comprises one or more programming instructions that, when executed, cause the server electronic device to:

receive the first key location identifier, the first write token and the encrypted signed combination value from the user electronic device, verify that the first write token corresponds to information saved at the first memory location, and in response to verifying that the first write token corresponds to information saved at the first memory location, save the encrypted signed combination value to the first memory location.

18. The system of claim 17, wherein the fourth computer-readable storage medium further comprises one or more programming instructions that, when executed, cause the server electronic device to:

receive the first key location identifier and a second read token from the service electronic device, verify that the second read token corresponds to information stored at the first memory location, and in response to verifying that the second read token corresponds to information stored at the first memory location, sending the encrypted signed combination value to the service electronic device.

19. The system of claim 18, wherein the computer-readable storage medium further comprises one or more programming instructions that, then executed, cause the service electronic device to:

obtain a first decrypted combination value by decrypting the encrypted signed combination value using the private key associated with the service;

extract the public key associated with the user from the first decrypted combination value;

use the public key to locate an account associated with the user; and send the second key location identifier and the first read token to the server electronic device.

20. The system of claim 19, wherein the fourth computer-readable storage medium further comprises one or more programming instructions that, when executed, cause the server electronic device to:

verify that the first read token corresponds to information stored at the second memory location, and in response to verifying that the first read token corresponds to information stored at the second memory location, sending the encrypted signed combination value to the service electronic device.

21. The system of claim 20, wherein the computer-readable storage medium further comprises one or more programming instructions that, then executed, cause the service electronic device to:

obtain a second decrypted combination value by decrypting the encrypted signed combination value received from the server electronic device using the private key associated with the service, compare the second decrypted combination value to the first decrypted combination value to determine if they match, and in response to the second decrypted combination value matching the first decrypted combination value, authenticate the session.

22. The system of claim 21, wherein the fourth computer-readable storage medium further comprises one or more programming instructions that, when executed, cause the server electronic device to:
    receive the first key location identifier and a first delete token from the service electronic device,
    verify that the first delete token corresponds to information stored at the first memory location, and
in response to verifying that the first delete token corresponds to information stored at the first memory location, deleting all information stored at the first memory location.

\* \* \* \* \*